US008990582B2

(12) United States Patent
Maino et al.

(10) Patent No.: US 8,990,582 B2
(45) Date of Patent: Mar. 24, 2015

(54) VIRTUAL MACHINE MEMORY COMPARTMENTALIZATION IN MULTI-CORE ARCHITECTURES

(75) Inventors: Fabio R. Maino, Palo Alto, CA (US); Pere Monclus, San Jose, CA (US); David A. McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

(21) Appl. No.: 12/789,207

(22) Filed: May 27, 2010

(65) Prior Publication Data
US 2011/0293097 A1 Dec. 1, 2011

(51) Int. Cl.
G06F 21/00 (2013.01)
G06F 12/14 (2006.01)
G06F 21/12 (2013.01)
G06F 12/08 (2006.01)

(52) U.S. Cl.
CPC .......... *G06F 12/1408* (2013.01); *G06F 21/123* (2013.01); *G06F 12/0848* (2013.01); *G06F 12/0811* (2013.01); *G06F 12/084* (2013.01)
USPC ............................................ 713/190; 726/12

(58) Field of Classification Search
CPC G06F 12/1408; G06F 21/123; G06F 12/0848
USPC .............................................. 713/190; 726/12
See application file for complete search history.

(56) References Cited

U.S. PATENT DOCUMENTS

| 5,444,781 | A  | * | 8/1995  | Lynn et al. ................. 380/46  |
| 6,101,255 | A  | * | 8/2000  | Harrison et al. ............ 380/52   |
| 6,895,506 | B1 | * | 5/2005  | Abu-Husein ................ 713/193   |
| 6,983,374 | B2 | * | 1/2006  | Hashimoto et al. ......... 713/194   |
| 7,272,832 | B2 | * | 9/2007  | Gardner ....................... 718/105 |
| 7,353,404 | B2 | * | 4/2008  | Hashimoto et al. ......... 713/194   |
| 7,565,492 | B2 | * | 7/2009  | Mckeen et al. .............. 711/129   |
| 7,568,112 | B2 | * | 7/2009  | Yamaguchi et al. ......... 713/190   |
| 7,657,034 | B2 | * | 2/2010  | Volp et al. ................... 380/268   |
| 7,865,733 | B2 | * | 1/2011  | Goto et al. ................... 713/176   |
| 8,001,374 | B2 | * | 8/2011  | Wise ........................... 713/164   |
| 8,108,641 | B2 | * | 1/2012  | Goss et al. ................... 711/163   |

(Continued)

FOREIGN PATENT DOCUMENTS

WO 2005006197 A2 1/2005

OTHER PUBLICATIONS

Fast Encryption and Authentication for Cache-to-Cache Transfers using GCM-AES Varun Jannepally, Sohum Sohoni International Conference on Sensors, Security, Software and Intelligent Systems Jan. 2009.*

(Continued)

*Primary Examiner* — Christopher Brown
*Assistant Examiner* — James Turchen
(74) *Attorney, Agent, or Firm* — Patterson & Sheridan LLP

(57) ABSTRACT

Techniques for memory compartmentalization for trusted execution of a virtual machine (VM) on a multi-core processing architecture are described. Memory compartmentalization may be achieved by encrypting layer 3 (L3) cache lines using a key under the control of a given VM within the trust boundaries of the processing core on which that VMs is executed. Further, embodiments described herein provide an efficient method for storing and processing encryption related metadata associated with each encrypt/decrypt operation performed for the L3 cache lines.

19 Claims, 7 Drawing Sheets

(56) References Cited

U.S. PATENT DOCUMENTS

| | | | |
|---|---|---|---|
| 8,195,957 B2* | 6/2012 | Dolgunov et al. | 713/190 |
| 8,423,789 B1* | 4/2013 | Poo et al. | 713/189 |
| 8,577,031 B2* | 11/2013 | Asperger et al. | 380/46 |
| 8,726,040 B2* | 5/2014 | Dolgunov et al. | 713/190 |
| 8,738,932 B2* | 5/2014 | Lee et al. | 713/190 |
| 2002/0184046 A1* | 12/2002 | Kamada et al. | 705/1 |
| 2003/0033537 A1* | 2/2003 | Fujimoto et al. | 713/193 |
| 2003/0198344 A1* | 10/2003 | Courcambeck et al. | 380/37 |
| 2005/0021986 A1* | 1/2005 | Graunke et al. | 713/193 |
| 2005/0105738 A1* | 5/2005 | Hashimoto | 380/277 |
| 2006/0195704 A1* | 8/2006 | Cochran et al. | 713/193 |
| 2007/0192632 A1 | 8/2007 | Botzum et al. | |
| 2008/0040618 A1* | 2/2008 | Andersson et al. | 713/193 |
| 2008/0066074 A1 | 3/2008 | Nutter et al. | |
| 2008/0155273 A1* | 6/2008 | Conti | 713/190 |
| 2009/0222675 A1* | 9/2009 | Lange et al. | 713/193 |
| 2010/0042824 A1* | 2/2010 | Lee et al. | 713/2 |
| 2010/0235651 A1* | 9/2010 | Iwamoto | 713/190 |
| 2010/0281273 A1* | 11/2010 | Lee et al. | 713/190 |
| 2010/0332843 A1* | 12/2010 | Boivie | 713/189 |
| 2014/0089681 A1* | 3/2014 | Goto et al. | 713/190 |

OTHER PUBLICATIONS

Towards Trusted Cloud Computing; Nuno Santos et al.; 2009; USENIX.*

Operating System Management of Shared Caches on Multicore Processors; David Tam; 2010; University of Toronto.*

New Cache Designs for Thwarting Software Cache-based Side Channel Attacks; Zhenghong Wang et al.; ACM; ISCA'07, Jun. 9-13, 2007.*

Defending against cache-based side-channel attacks; D. Page; 2003; Elsevier Science Ltd.*

Resource Management for Isolation Enhanced Cloud Services; Himanshu Raj et al; CCSW'09; ACM; Nov. 13, 2009.*

SENSS: Security Enhancement to Symmetric Shared Memory Multiprocessors; Youtao Zhang et al; Proceedings of the 11th Int'l Symposium on High-Performance Computer Architecture (HPCA-11 2005); 2005; IEEE.*

International Search Report for application No. PCT/US2011/037804 dated Sep. 23, 2011.

Jun Yang et al.; "Improving Memory Encryption Performance in Secure Processors"; IEEE Transactions on Computers, IEEE Service Center; May 1, 2005; pp. 630-640, vol. 54 No. 5, Los Alamitos, CA, US.

Rogers et al.; "Single-Level Integrity and Confidentiality Protection for Distributed Shared Memory Multiprocessors"; IEEE 14th International Symposium on High Performance Computer Architecture, HPCA 2008; Feb. 16, 2008, pp. 161-172, Piscataway, NJ, US.

* cited by examiner

VIRTUAL MACHINE MEMORY COMPARTMENTALIZATION IN MULTI-CORE ARCHITECTURES

TECHNICAL FIELD

Embodiments presented in this disclosure generally relate to techniques for providing a computing infrastructure for a virtualization server, and more particularly, to a method and apparatus for trusted virtual machine execution in an Infrastructure as a Service (IaaS) cloud environment.

BACKGROUND

Server virtualization technology allows multiple virtual machines to run concurrently on a single physical computing system. Currently, data center environments are used to create large clusters of such physical computing systems (commonly referred to as servers), where each server runs multiple virtual machines (VMs). This approach has led to data centers that can supply massive amounts of computing power. Several providers currently allow users to supply virtual machine instances to run on the virtualization servers provided by the operator of the data center. In various forms, this general model of computing has come to be referred to as "cloud computing" or "Infrastructure as a Service" (IaaS) because users simply run their virtual machine instances on an abstract hardware platform, without having to own or manage that hardware platform. This approach allows a given user to rapidly scale up dozens, if not hundreds or thousands of virtual machine instances to respond to changes in demand for computing resources.

At the same time, a significant obstacle faced by of cloud computing and IaaS providers is the need for users to trust the cloud provider and the implementation of the hypervisor (or Virtual Machine Manager, (VMM)) that manages multiple VMs running on a server. Currently this is done by audits and understanding of the operating processes that cloud providers have in place in regards to security. This leads to a sense of trust, but there is not a strong mechanism to guarantee effective separation between VMs executed in the same central processing unit (CPU) socket server.

The fact that VMs belonging to different enterprises are collocated in the same server can lead to side attacks and security concerns. For example, when VMs belonging to different enterprises are executed in distinct cores of the same CPU, they share access to memory via an L3 cache (or bypassing memory protections set by the hypervisor). In the hands of skilled individuals, this could lead to information being leaked from one VM to the other. That is, a malicious VM from one enterprise could try to gain access the memory of a VM running on behalf of another enterprise.

Another concern is the hypervisor itself. Even if the hypervisor is designed to enforce separation between distinct VMs, data could still leak from one VM to the other either for a hypervisor bug or for explicit attacks directed against the hypervisor itself. Further, another set of attacks could be launched by a malicious administrator who is part of the cloud provider personnel.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1B:
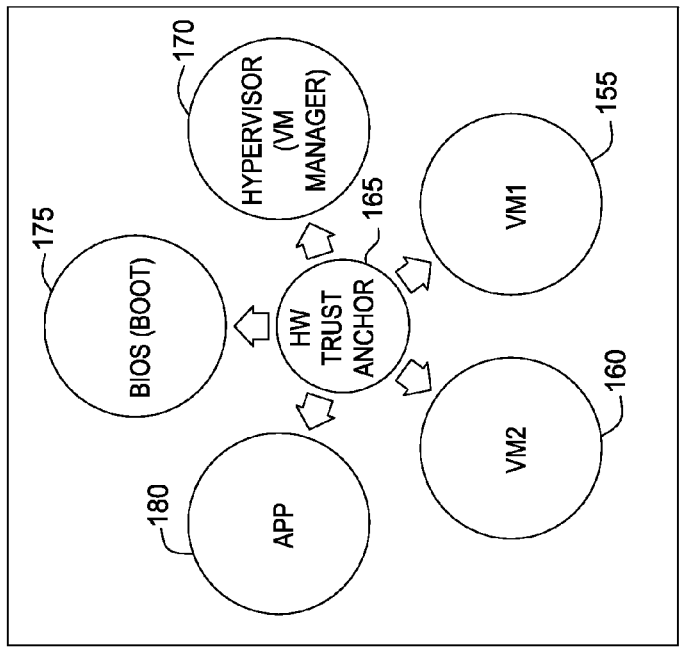
FIGS. 1A-1B are block diagrams illustrating different security models for trusted execution in Infrastructure as a Service (IaaS) cloud environments, according to certain embodiments of the present disclosure.

One embodiment described herein includes a method. The method may generally include identifying a memory address, obtaining a nonce, and generating a keystream using at least a first key, the nonce, and the identified memory address. The method may also include encrypting, using the generated keystream, data corresponding to the memory address while being written from a first cache to a second cache. The first cache is local to one of a plurality of processing cores on a central processing unit (CPU). And the second cache is shared by the plurality of processing cores. The method may also include writing the nonce to the second cache.

Another embodiment described herein provides a computing system which includes a memory and a CPU having a plurality of processing cores. Each of the cores may itself have a first cache, and the CPU may also include a second cache, wherein the second cache is accessible by each of the plurality of processing cores. Each processing core may include an encrypt/decrypt block coupling a respective processing core to the second cache. The encrypt/decrypt blocks may generally be configured to perform an operation which includes identifying a memory address, obtaining a nonce, generating a keystream using at least a first key, the nonce, and the identified memory address, and encrypting, using the generated keystream, data corresponding to the memory address while being written from the first cache to the second cache. The CPU may further include a memory controller configured to write the nonce to the second cache.

Still another embodiment described herein includes a method. This method may generally include attempting to perform a read operation to read data associated with a memory address into one of a plurality of first caches. Each of the first caches is local to one of a plurality of processing cores on a central processing unit (CPU). Further, the read operation attempts to read the data associated with the first memory address from a second cache shared by the plurality of processing cores. Upon determining the data associated with the memory address is in the second cache, the read operation may be performed by obtaining a nonce, generating a keystream using at least a first key, the nonce and the memory address. The read operation may also include decrypting, using the generated keystream, the data associated with the memory address while being read from the second cache to the first cache.

Description of Example Embodiments

Embodiments described herein provide techniques for memory compartmentalization for trusted execution of a virtual machine (VM) on a multi-core processing architecture. Memory compartmentalization may be achieved by encrypting layer 3 (L3) cache lines using a key under the control of a given VM within the trust boundaries of the processing core on which that VMs is executed. Further, embodiments described herein provide an efficient method for storing and processing encryption related metadata associated with each encrypt/decrypt operation performed for the L3 cache lines.

As described in greater detail below, a physical multi-core CPU may include a hardware trust anchor component. The trust anchor may be configured to manage keys used to encrypt/decrypt instructions and data when a VM or hypervisor is executed on a core of the multi-core CPU. In one embodiment, the trust anchor may receive a key associated with an encrypted VM boot image using a secure communications process. Once received and stored by the trust anchor, the key may be used to decrypt the VM boot image and load it into memory on the virtualization server. The trust anchor may also generate (or obtain) a session key used to encrypt/decrypt data written to and read from the L3 cache when that VM is executed on one of the processing cores of the multi-core CPU.

In one embodiment, the trust anchor may encrypt/decrypt data written to and read from the L3 cache using Advanced Encryption Standard (AES) Counter Mode (AES-CTR). Using AES-CTR may provide encryption speeds sufficient to encrypt/decrypt data moving between an L2 cache on a core and the L3 cache shared among multiple processing cores within a multi-core architecture. Of course, other stream ciphers with sufficient performance characteristics may be used. More generally, any keyed pseudorandom function can be used in Counter Mode; AES is a commonly used pseudorandom function, which we use for concreteness in describing an embodiment. Using AES-CTR, the actual encryption may be performed by XORing plaintext as it is written to the L3 cache with a keystream generated by encrypting successive incremental values of a counter using a key associated with the execution context of a given VM (i.e., with the session key). In one embodiment, the counter used to generate the keystream for encrypting/decrypting L3 cache lines is composed by concatenating a memory address associated with a particular read/write operation and a nonce value.

In the case of a write operation, the nonce value may be a counter value incremented each time a write operation is performed or simply a value derived from a source of random noise. The nonce value used for a given write operation is also stored in the L3 cache with the encrypted data. Further, should a cache flush occur, the nonce value is written to memory along with the encrypted data. For a read operation, the nonce value is used (in conjunction with the memory address) to recreate the keystream. The actual decryption may be performed by XORing the ciphered data with the keystream as it is read from the from L3 cache and written to the L2 cache on a processor core. In one embodiment, a memory controller on the CPU is configured to manage writing the nonce values written to and read from the L3 cache and memory.

When an exception occurs (e.g., a timer interrupt, a hardware access, etc.) the trust anchor swaps out the session key associated with the running VM instance and selects the appropriate key for a new execution context. In one embodiment, the CPU may be configured to signal the trust anchor with an execution context for the next VM instance (or hypervisor) scheduled for execution. For example, the virtualization extensions provided by the Intel® VT-x technology and AMD-V technology. Further, the process for switching keys and initializing an encryption engine included in the trust anchor may require fewer clock cycles than required for the context switch itself.

The following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

Figure 1A:
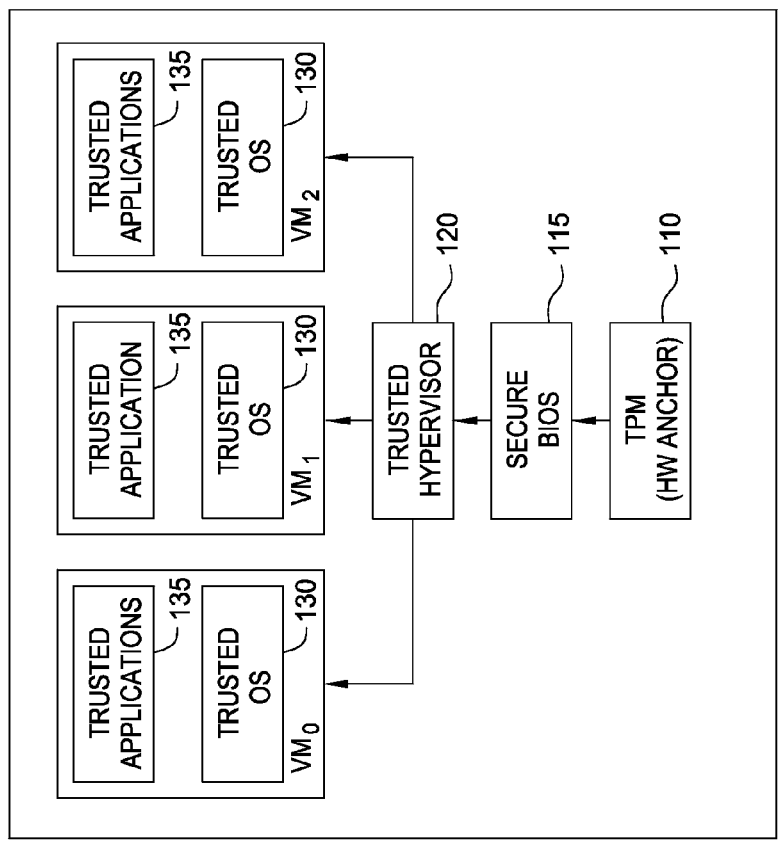

FIGS. 1A-1B are block diagrams illustrating different models for trusted VM execution in Infrastructure as a Service (IaaS) cloud environments, according to certain embodiments of the present disclosure. As shown in FIG. 1A, a stack model 105 may be used to provide a trusted environment for executing one or more virtual machines 125. In particular, a hardware anchor chip (e.g., a Trusted Platform Module (TPM) 110), or equivalent, may be used to perform the following tasks: secure key storage, signature imposition/verification, and secure export of keys, etc. The TPM 110 forms the fist link of trust in the stack model 105. Once the TPM 110 validates it, the secure BIOS 115 may in turn validate that the hypervisor 120 has not been modified. Doing so extends the trust chain from the TPM 110 to the secure BIOS 115, and subsequently, to the hypervisor 120. Once booted, the hypervisor 120 follows the same procedure to bring up the virtual machine 125. That is, once validated by the secure BIOS 115, the hypervisor 120 acts as a trusted actor to validate and boot a virtual machine instance 125. Thereafter, the operating system 130 on each virtual machine 125 do the same to boot applications 135. More simply, TPM 110 validates the BIOS 115, which validates the hypervisor 120, which in turn validates each VM 125 booted on the hypervisor 120. Thus, the stack model 105 relies on each element in the chain trusting its predecessor.

In stack model 105, the upper layers rely on the lower layers for trust. If there is any breakage on the chain, the system is not secure. Further, the lower layers on the chain may still have visibility to what upper layers may be executing. Further still, even when a hypervisor validates and boots a given virtual machine 125, it does not limit the actions performed by trusted OS 130 and trusted applications 135. Thus, the stack model 105 does not prevent an otherwise validated application 135 (or VM 125) from accessing data belonging to another VM executed by the hypervisor 120, e.g., data stored in a L3 cache.

Figure 2:
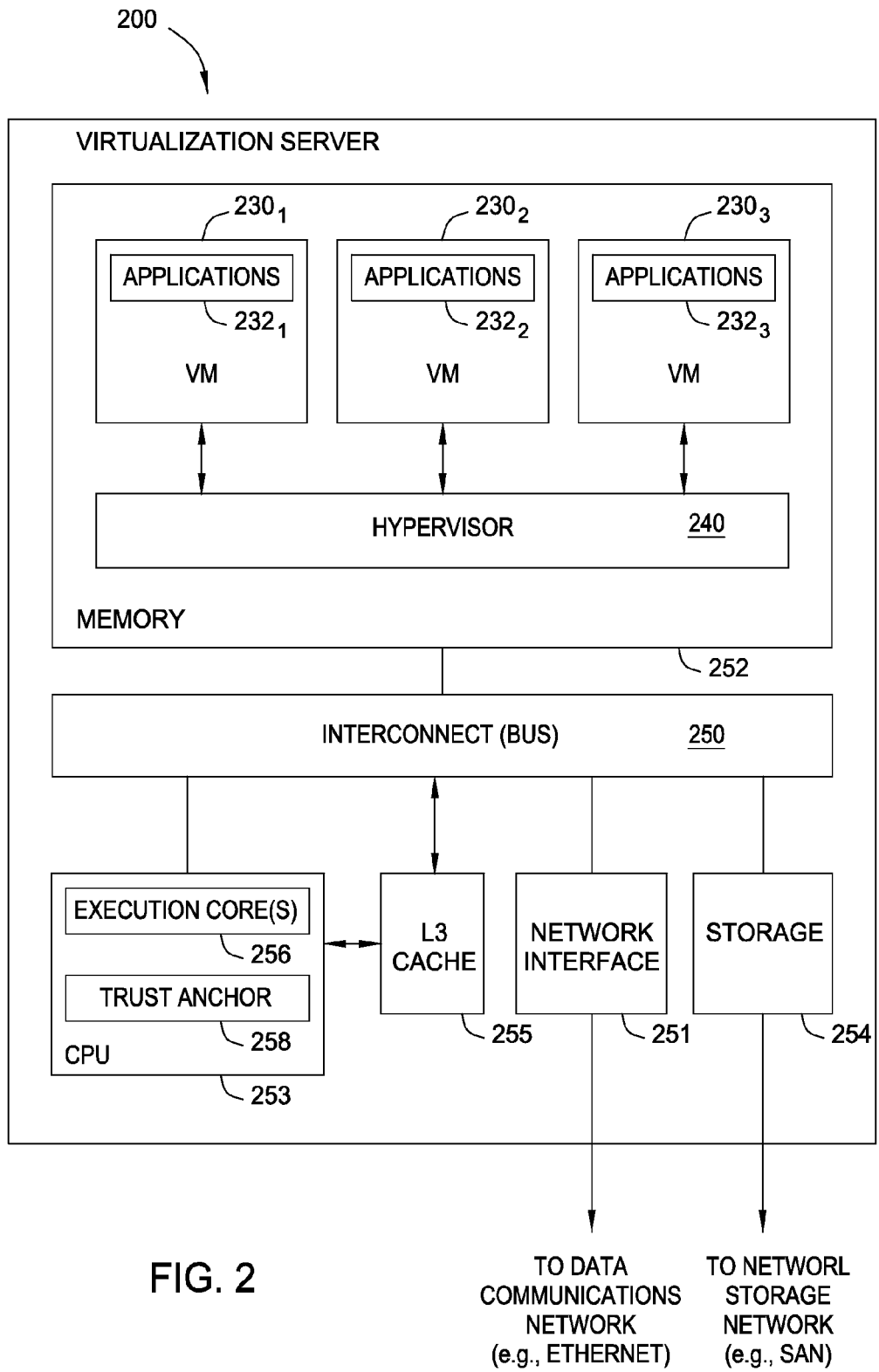
FIG. 2 is a block diagram illustrating components of a virtualization server configured to provide for the trusted execution of multiple VMs in an IaaS environment, according to certain embodiments of the present disclosure.
Figure 3:
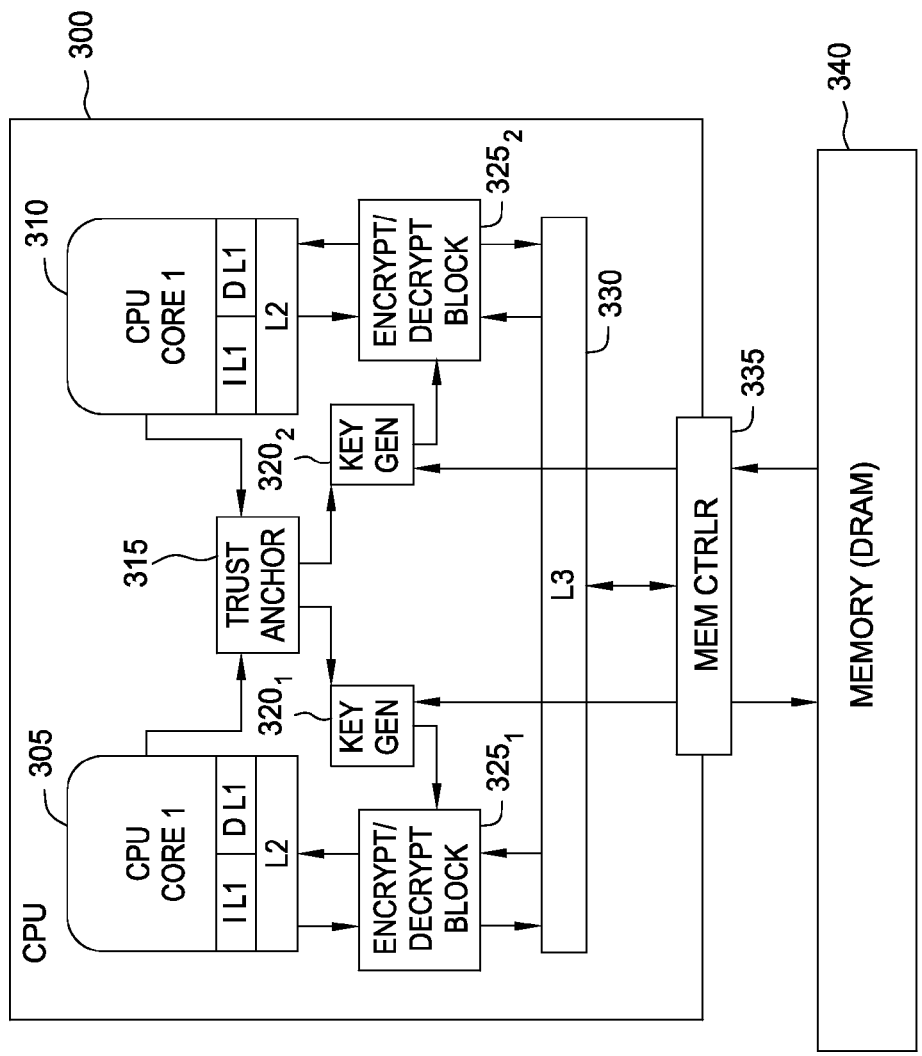
FIG. 3 is a block diagram illustrating an example of a processor architecture configured to provide for trusted virtual machine execution in an IaaS environment, according to certain embodiments of the present disclosure.
Figure 4:
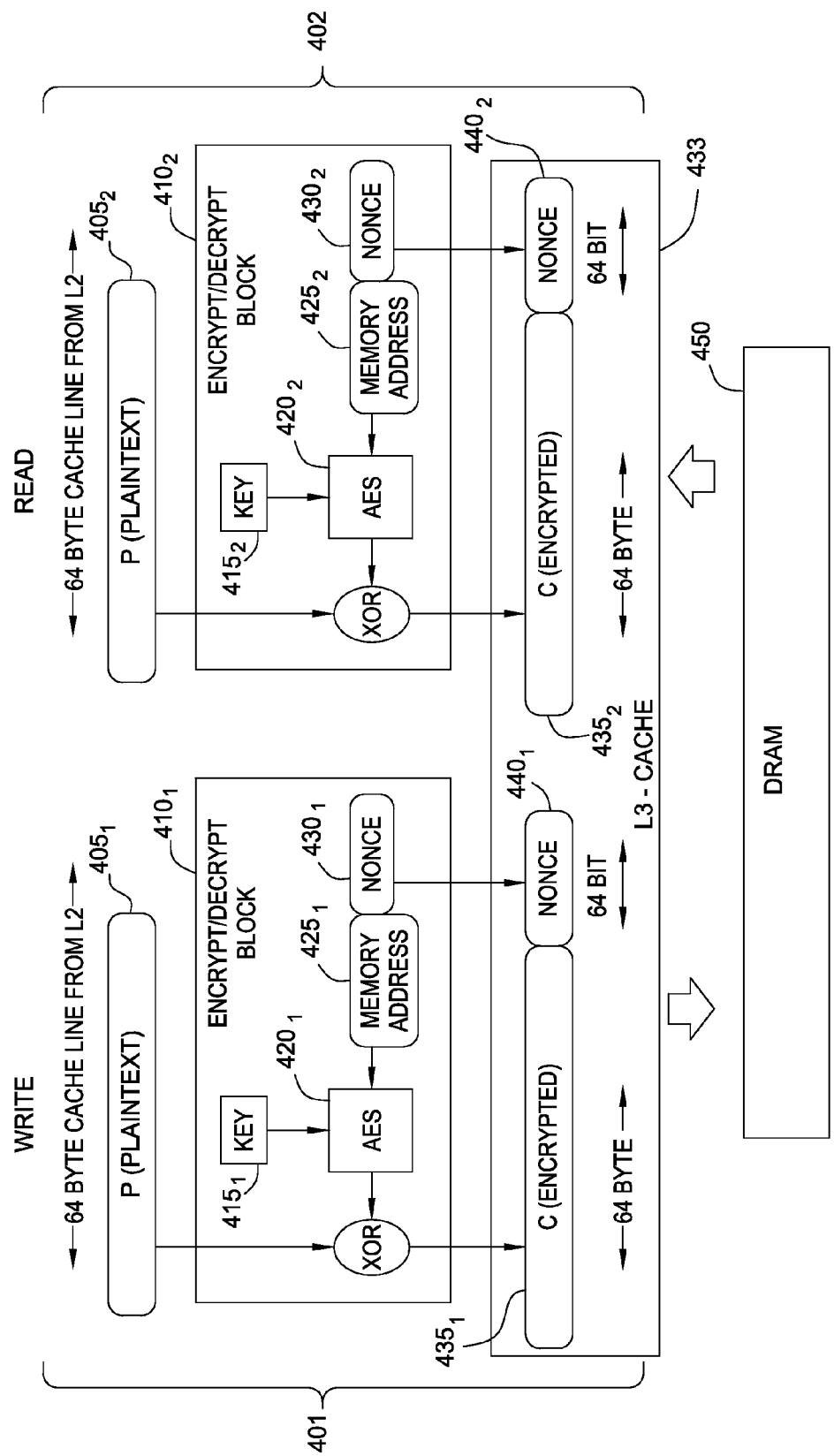
FIG. 4 further illustrates aspects of the CPU architecture first shown in FIG. 3, according to certain embodiments of the present disclosure.

FIG. 1B shows an alternative trust model, according to one embodiment presented in this disclosure. As shown, the trust model 150 provides a star model where the trust anchor 165 sits in the middle rather than at the bottom. Doing so allows the trust anchor 165 to directly validate a BIOS 175 and a hypervisor 170 on a virtualization server. But further, doing so also allows the trust anchor 165 to validate each VM image passed to the hypervisor 170 for execution (e.g., VM1 155 and VM2, 160) as well as to validate code for applications 108 to load and execute on the VMs 155,160. That is, unlike the stack model 105, the star model 150 provides a trust anchor 165 configured to provides a trust anchor 165. In order to prevent unauthorized access between execution contexts, the star model 150 shifts from integrity protection (in the stack model) to confidentiality for each relevant actor within a virtualization server. Doing so may be used to provide a secure computing environment for VMS 155, 160. For example, unlike the stack model 105, the star model 150 prevents actors with higher privileges (e.g., hypervisor 170) from accessing the data of other actors (e.g., VMs 155,160) as wells as prevents one VM from accessing data belonging to another VM, even when such VMs are executed concurrently in different cores on a multi-core processor and sharing an L3 cache and memory. FIGS. 2-4, discussed below, provide an example architecture implementing the star model 150 shown in FIG. 1B on a virtualization server with a multi-core CPU.

FIG. 2 is a block diagram illustrating components of a virtualization server 200 configured to provide for the trusted execution of multiple VMs in an IaaS environment, according to certain embodiments of the present disclosure. The virtualization server 200 may generally include a collection of hardware computing components connected by one or more interconnects 250. Illustratively, virtualization server 200 includes network interface cards (NICs) 251, a memory 252, CPU(s) 253, and a storage device 254 (e.g., a locally attached disk drive, solid-state device (SSD), or a connection to remote storage such as a SAN).

Virtualization server 200 allows multiple virtual machines (VMs) $230_{1-3}$ to execute on the server 200 concurrently, sharing the computing hardware present on the virtualization server 200. However, the virtual machines $230_{1-3}$ are not generally aware of the computing hardware on the virtualization server 200 directly. Instead, a hypervisor 240 may be configured to provide virtualized hardware elements for each virtual machine $230_{1-3}$. Note, while the virtual hardware allocations appear distinct to the OS and applications 136 running on each virtual machine $230_{1-3}$, they are shared below the virtualization layer. That is, the virtual resources provide an abstraction for the underlying physical resources—and the underlying physical resources are shared among the virtual machines $230_{1-3}$.

Illustratively, the memory 252 includes the hypervisor 240 managing three virtual machine instances (VMs) $230_{1-3}$. Each VM $230_{1-3}$ provides a virtualized computing platform with a virtual CPU, memory, storage, and networking interfaces. An operating system is booted on each VM $230_{1-3}$ and used to load and execute applications $232_{1-3}$. In one embodiment, the hypervisor 240 may be implemented as a software layer that runs directly on the computing hardware of the virtualization server 200. In such a case, the hypervisor 240 may be configured to intercept some (or all) operating system calls made by the OS running on a VM 230.

More generally, the hypervisor 240 runs over the system hardware and allows the virtualization server 200 to host the VMs $230_{1-3}$. In one embodiment, a trust anchor 258 may be used to validate the hypervisor 240. That is, the hypervisor 240 (i.e., the image of the hypervisor 240 on a storage disk) 240 may be signed by an encryption key, and the trust anchor 258 may be configured to obtain the key needed to verify that the hypervisor 240 has not been modified, prior to loading the hypervisor 240. For example, a given IaaS provider (or hypervisor vendor) may sign the hypervisor code using a private key of a private/public key pair. In some cases, the public key may also be signed by a certificate authority (and provided as part of a PKI certificate). In turn, the trust anchor 258 may obtain the public key from the PKI certificate and validate the digital signature associated with the hypervisor 240.

Once validated, the hypervisor 240 may boot and execute VMs $230_{1-3}$. Further, each VM 230 may also be a signed and/or encrypted object. For example, an enterprise may transmit a VM image encrypted using a VM image encryption key to the virtualization server 200. In one embodiment, the trust anchor 258 authenticates itself to the enterprise in order to obtain the VM image encryption key associated with a given VM 230 prior to executing that VM 230 on the virtualization server 230. The VM image encryption key may be used to decrypt an encrypted VM image submitted to the virtualization server 200.

Further, the trust anchor 258 may generate (or obtain) a memory session key for each given VM 230 and use it to encrypt/decrypt information read from and written to the cache 255 while a VM executes on one of the execution cores 256. In one embodiment, the trust anchor 258 may generate a memory session key as part of loading a given VM instance. The trust anchor 258 may be configured to swap memory session keys whenever the execution context on one of the execution cores 256 on CPU 253 is changed, e.g., a context-switch between different VMs $230_{1-3}$ or between a VM $230_{1-3}$ and the hypervisor 240 itself.

The cache 255 provides a high-speed memory accessed by the execution cores 256 on the CPU 253. While memory 252 can be segmented across virtual machines 230, cache 255 is often shared by different VMs $230_{1-3}$. For example, as shown, CPU 253 may include one or more execution cores 256. When distinct VMs $230_{1-3}$ are executed on different execution cores 256, the VMs $230_{1-3}$ may share access to the cache 255. In one embodiment, the trust anchor 258 may use a distinct memory session key for each VM 230 to encrypt/decrypt each read/write to the cache 255. Doing so prevents a VM 230 executing on one execution core 256 from accessing data in the cache 255 belonging to another VM 230 executing on a different execution core 256. Further, doing so also prevents the hypervisor 240 from accessing data in the cache 255 belonging to a given VM $230_{1-3}$, despite the hypervisor 240 having a generally higher privilege level.

FIG. 3 is a block diagram illustrating an example of a processor architecture configured to provide for the trusted virtual machine execution in an IaaS environment, according to certain embodiments of the present disclosure. As shown, a CPU 300 includes two distinct processing cores 305, 310. And each CPU core 305 includes a layer 1 (L1) instruction and data cache and an L2 cache. CPU 300 also includes a trust anchor 315, and processing cores 305, 310 each have an associated key generation component $320_{1-2}$ and an encrypt/decrypt block $325_{1-2}$. Illustratively, cache lines connecting processing cores 305, 310 to a shared L3 cache 330 each include one of the encrypt/decrypt blocks $325_{1-2}$. The L3 cache 330 is connected to a memory controller 335, which in turn is connected to a memory 340.

Although CPU 300 illustrates an example embodiment with two processing cores 305, 310, one of ordinary skill in the art will recognize that the embodiments described herein can readily be adapted for a CPU having more processing cores. In such a case, each additional CPU core would include a connection to the trust anchor 315 as well as a key generation component 320 an encrypt/decrypt block connected the shared L3 cache 330.

In one embodiment, the trust anchor 315 may be configured to manage multi-tenancy execution context (i.e., the execution of multiple virtual machine images) on the processing cores 305, 310 as well as manage communications with the external world. For example, the trust anchor 315 may be configured to provide a secure boot process for loading and booting a VM instance, to provide for secure context switching between VM instances, to swap memory session keys based on execution context, and to provide for secure key storage during VM execution. Further, the trust anchor 315 embedded with the CPU 300 may be provisioned, at manufacturing time, with a public/private key pair and a certificate issued by a certificate authority (CA) that binds the trust anchor identity to the public key. The CPU model and manufacturer name may be included as attributes of this certificate. In one embodiment, the trust anchor 315 may use the public/private key pair to prove that a virtualization server has a multi-core CPU configured with a trust anchor and, accordingly, can boot and execute a VM image in an otherwise untrusted cloud environment.

Additionally, the trust anchor 315 may receive an indication from a processing core 305, 310 whenever a context switch occurs. Such an indication may provide an identifier for an incoming execution context. As noted above, certain multi-core processors provide an extended instruction set that allow for an execution context to be exported from a processing core on a CPU. For example, the virtualization extensions provided by the Intel® VT-x technology and the VMX instruction set provide instructions used to signal changes in execution context on a processing core (e.g., the VMEXIT and VMRESUME instructions).

In response to a signal from one of the cores 305, 310 indicating a change in execution context, the trust anchor 315 may configure the encrypt/decrypt block $325_{1-2}$ and key generation component $310_{1-2}$ associated with that processing core 305, 310 for the new execution context. When a context switch occurs, the trust anchor swaps out a key associated with the then current execution context on a processing core 305, 310 and replaces it with a key associated with the incoming execution context. As is known, a context switch on a multi-core processor between VM instances (or between a VM instance and the hypervisor) requires registers (e.g., status, IR, general purpose, counters) on the CPU core to be restored (or initialized) for the incoming execution context. In one embodiment, the trust anchor 315 may be configured to swap the appropriate encryption key and initialize the encrypt/decrypt block $325_{1-2}$ using fewer clock cycles than required to perform the context switch itself (currently, a process that typically requires ~20-30 clock cycles). Doing so allows the trust anchor to provide a secure execution context for the incoming VM instance (or hypervisor) without introducing any collateral latency.

Once initialized, the encrypt/decrypt block 325 encrypts/decrypts data as it is moved over cache lines between the processing core 305, 310 and the L3 cache 255. In one embodiment, the encrypt/decrypt blocks $325_{1-2}$ provide a hardware based implementation of a stream cipher. As is known, stream cipher is a symmetric key cipher where plaintext is combined with a keystream to encrypt small units of data (e.g., a single bit or byte at a time). In a particular embodiment, the encrypt/decrypt blocks may be configured to use AES-CTR (Advanced Encrypted Standard-Counter mode) as the stream cipher. Using a stream cipher allows data to be encrypted/decrypted as it moves between a processing core 305, 310 and the L3 cache 330 without requiring additional clock cycles. Instead, once initialized, the encrypt/block $325_{1-2}$ may simply XOR each bit being moved to/from the particular core 305, 310 using the keystream.

Thus, the functionality provided by the trust anchor is located adjacent to each processing core 305, 310 and secures any element shared by VMs running on different cores (in this case L3 cache 330 and memory 340). In one embodiment, the key generation components $320_{1-2}$ may be configured to use a VM key, a memory address and a nonce to generate a keystream used by the encryption/decryption blocks $325_{1-2}$.

The memory controller 335 may be configured to move data between memory 340 and the L3 cache. For example, the memory controller 335 may select to flush data from the L3 cache 330 to the memory 340. In one embodiment, when doing so, the memory controller 335 also writes the nonce value used to encrypt the data when it was written to the L3 cache 330 to memory 340. Similarly, the memory controller 335 may retrieve the appropriate nonce value when reading encrypted data from the memory 340.

FIG. 4 further illustrates aspects of the processor architecture first shown in FIG. 3, according to certain embodiments of the present disclosure. In particular, FIG. 4 shows the processor architecture of FIG. 3 used to perform a secure write operation 401 to an L3 cache 433 and used to perform a secure read operation 402 from the L3 cache 433.

As shown, the write operation 401 encrypts plaintext data $405_1$ as it is moved from an L2 cache local to a processing core to an L3 cache 433 shared by multiple processing cores. Illustratively, an encrypt/decrypt block $410_1$ includes a key $415_1$, an AES engine $420_1$, a memory address $425_1$ and a nonce $430_1$. The key $415_1$ is provided to the encrypt/decrypt block $410_1$ by the trust anchor. As noted above, the key $415_1$ corresponds to a VM (or hypervisor) being executed on one of the processing cores of a multi-core CPU (e.g., the processor architecture shown in FIG. 3). The memory address $425_1$ corresponds to a memory address of the plaintext $405_1$ being written from an L2 cache to the shared L3 cache 433. The nonce $430_1$ provides a one-time value used for a given write operation. Typically, the nonce $430_1$ may be a counter value incremented for each write (and read) to the shared L3 cache 433. Alternatively, however, the nonce $430_1$ may be generated from a random or pseudo-random noise source.

In one embodiment, the AES engine 420 provides a hardware implementation of the AES-CTR stream cipher and is configured to generate a keystream from the key material, i.e., from the key $415_1$, the memory address $425_1$, and the nonce $430_1$. The resulting keystream is XORed with the plaintext $405_1$ as it is pushed from the L2 cache on a processing core to the shared L3 cache 433, resulting in ciphertext $435_1$. In addition to writing the resulting encrypted data to the L3 cache 433, the nonce value in the encrypt/decrypt block $410_1$ is also written to the L3 cache 433 (shown in FIG. 4 as nonce $440_1$). More generally, the encrypt/decrypt block may apply any keyed pseudorandom function to the counter, in order to generate a keystream XORed with the plaintext $405_1$.

In one embodiment, the encrypt/decrypt block $410_1$ may include a separate cache line to the L3 cache 433 allowing the nonce $430_1$ to be stored in the L3 cache 433 (as nonce $440_1$) in parallel with the plaintext $405_1$ being enciphered using the keystream and stored in the L3 cache 433 as ciphertext $435_1$. Alternatively, the nonce $340_1$ may written to the cache 433 using the same cache line used to write the ciphertext $435_1$.

The read operation 402 is similar to the write operation 401, but in the reverse direction. To read enciphered data $435_2$ from the L3 cache 433, the memory address $425_2$ and the nonce $440_2$ are read into the encrypt/decrypt block $410_2$. Again, the key $415_2$ is the session key associated with a VM (or hypervisor) being executed on a processing core of a multi-core processor—and remains unchanged between context switches on the processing core. The memory address $425_2$ corresponds to the memory address of the data being pulled into the L2 cache and the nonce $430_2$ is the nonce value used to encipher the data when it was written to the L3 cache 433. That is, the same key material used by the write operation 401 to generate a keystream used to encrypt the plaintext $405_1$ is used to re-generate the same keystream to decrypt the encrypted data $435_2$ from the L3 cache 433. Accordingly, in one embodiment, AES-CTR is used to generate the keystream from the key material for the read operation 402. Of course, other keyed pseudorandom functions may be used. The resulting keystream is then XORed with the encrypted data $435_2$ from the L3 cache 433 and written as plaintext $405_2$ in the L2 cache.

Figure 5:
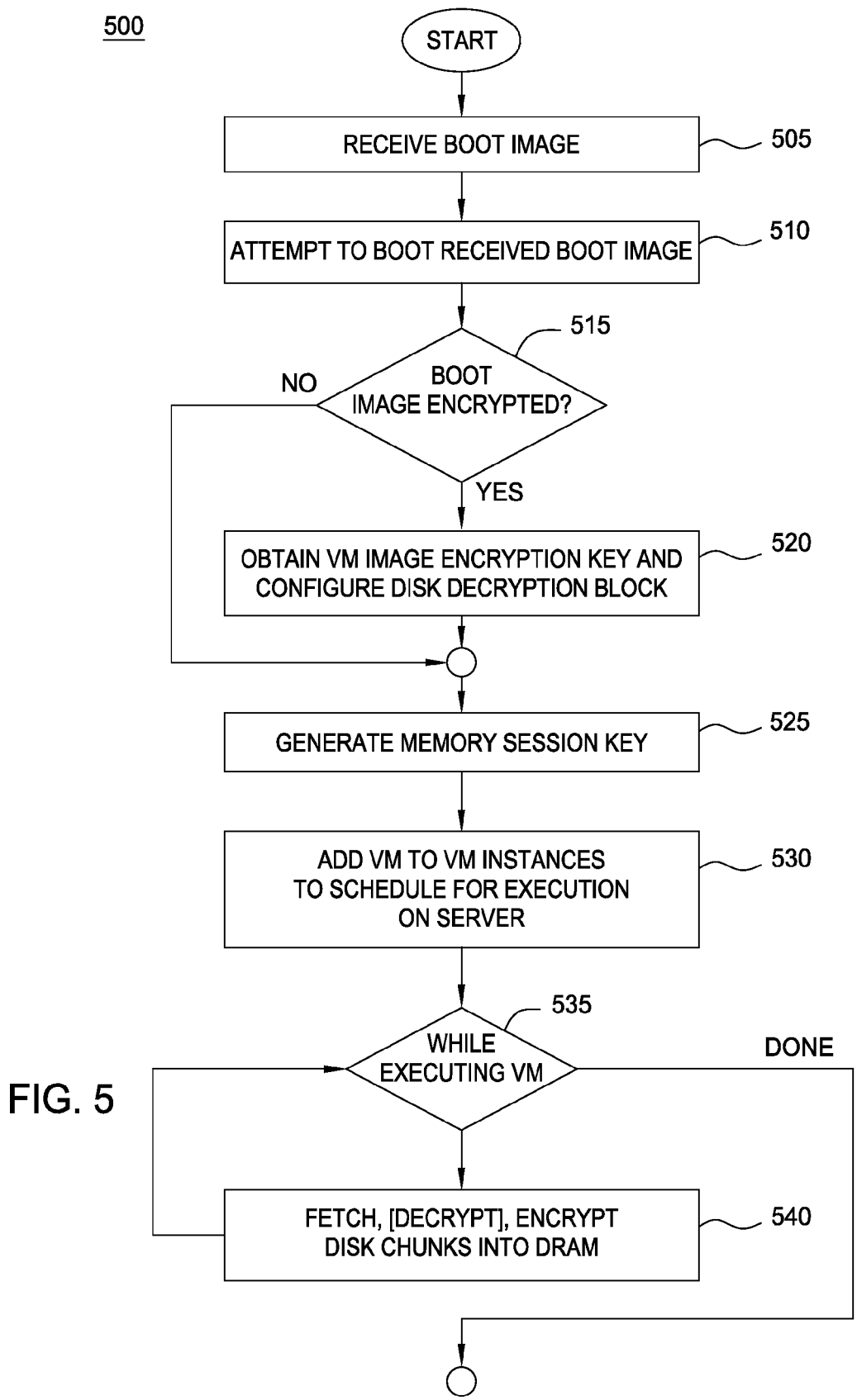
FIG. 5 illustrates a method for securely booting a VM instance, according to certain embodiments of the present disclosure.

FIG. 5 illustrates a method 500 for securely booting a VM instance, according to certain embodiments of the present disclosure. As shown, the method 500 begins at step 505 where a hypervisor receives a boot image of a virtual machine to boot and execute on a virtualization server. For example, in one embodiment, a user may transmit a VM boot image to a cloud provider along with a set of requirements for the virtualized hardware system on which to execute the VM instance (e.g., a processor speed, memory requirements, etc.). The VM boot image may be encrypted using a VM image encryption key generated by the user. In one embodiment, each 4 kb chunk is encrypted independently so that chunks may be decrypted and paged in and out of memory on the virtualization server without decrypting the whole image At step 510, the hypervisor attempts to boot the VM boot image. At step 515, the hypervisor determines whether the VM boot image is encrypted. If so, the hypervisor triggers a negotiation between the trust anchor and the user that submitted the VM boot image for execution (or an associated key service) to obtain the VM image encryption key used to encrypt the VM boot image. Once obtained, the trust anchor configures a disk control block with that key (step 520). The VM image encryption key is used to decrypt memory pages of the encrypted VM boot image as they are fetched from storage and stored in memory (or encrypt pages flushed from memory to storage). The trust anchor stores the VM image encryption key associated with the VM image in a secure key store. At step 525, the trust anchor also generates a memory session key used to configure an encrypt/decrypt block in cache lines between an L3 cache and memory and between the L3 cache and an L2 cache on each processing core. Once the encrypt/decrypt blocks on the CPU are configured, the VM image may be fetched from storage and booted. The hypervisor may them boot the VM image and schedule it for execution (step 530).

At step 535, the hypervisor executes the VM image on one of the processing cores. As portions of the encrypted VM image are fetched from storage, the disk control block decrypts them using the VM image encryption key (step 540). The memory session key is then used to re-encrypt such elements as they are written to an L3 cache. When data for a given memory address is needed, the memory session key in the cache line between the L2 cache of a processing core and the shared L3 caches is used to decrypt data read from (and written to) the L3 cache. Thus, the data in the L3 cache (shared among multiple processing cores) remains encrypted until fetched into an L2 cache (local to a processing core).

If the VM boot image is not encrypted (step 515), then the trust anchor may still generate a memory session key in order to encrypt/decrypt all write/reads made by the L3 cache by the VM while executing on a processing core (step 525). In either case, the hypervisor may begin scheduling the VM for execution on one of the processing cores of a multi-processor CPU (step 530). Additionally, when the hypervisor initiates a context switch, the trust anchor configures the encrypt/decrypt blocks on the CPU with the appropriate VM image encryption key and memory session key for an incoming VM.

Figure 6:
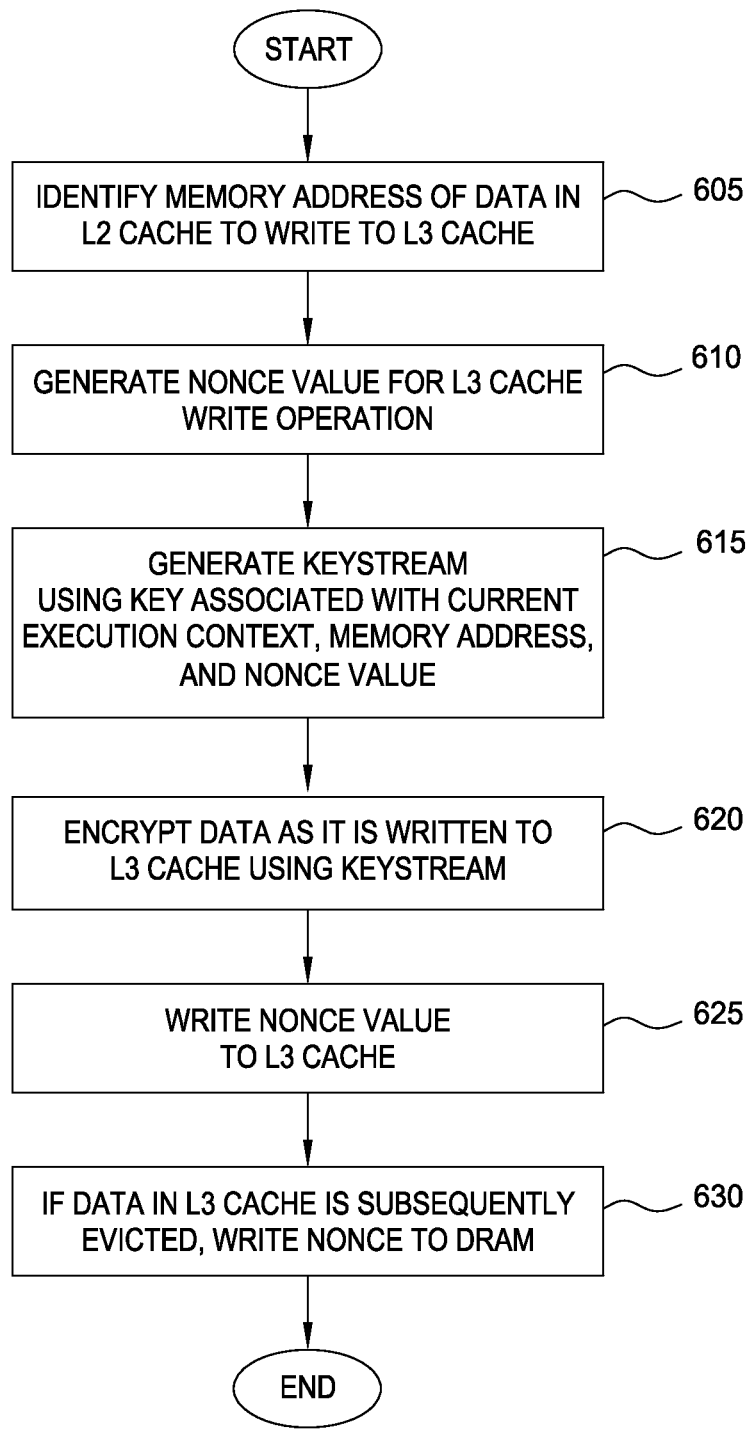
FIG. 6 illustrates a method for encrypting an L3 cache line, according to certain embodiments of the present disclosure.

FIG. 6 depicts a method 600 for encrypting an L3 cache line, according to certain embodiments of the present disclosure. The method 600 further illustrates the write operation 401 of FIG. 4. As shown, the method begins at step 605, where a memory address of data in the L2 cache to write to the L3 cache is identified (e.g., memory address $425_1$). At step 610, the encrypt/decrypt block on the cache line between the L2 cache and the L3 cache obtains a nonce value for the write operation (e.g., nonce $430_1$). In one embodiment, the nonce value is a 64 bit integer value provided by the trust anchor. For example, the trust anchor may simply store and increment a 64-bit value for each write operation. A 64-bit nonce value is likely to be large enough to ensure that a nonce value is never reused for the lifetime of a core.

At step 615, the encrypt/decrypt block generates a keystream. The keystream may be generated using the identified memory address, the nonce value and the session key associated with the current execution context of the processing core writing data from its L2 cache to the shared L3 cache. Typically, the keystream is generated by successively encrypting the incremental values of the counter (i.e., the memory address and nonce) with the session key (e.g., key $415_1$). For example, as noted above, the encrypt/decrypt block on a given L2/L3 cache line may provide a hardware implementation of the AES-CTR mode stream cipher. A full AES implementation may sustain throughput of 400-500 Gbps generated by memory reads and write. However, using AES-CTR introduces a small amount of latency in generating the first 128 bits of the keystream used to encrypt/decrypt a 64-byte cache line. This amounts to about 10 clock cycles needed to execute 10 AES rounds required by AES-128 prior to beginning a write to the L3 cache. Accordingly, each memory write operation that generates an L2 cache flush or eviction will introduce the extra latency of ~10 clock cycles needed to generate the first 128 bits of the keystream.

At step 620, once the first 128 bits of the keystream are available, the encrypt/decrypt block encrypts data as it is written to the L3 cache using the keystream. For example, when the 64-byte L2 cache entry is written into the L3 cache, the plaintext L2 cache line (i.e., plaintext $405_1$) is XORed with the keystream generated by the AES block in encrypting the counter with the session key. The resulting ciphertext (i.e., ciphertext $435_1$) is stored in the L3 cache.

At step 625, the nonce value is written to the L3 cache (e.g., nonce $440_1$). That is, the nonce value used for encrypting a given write operation is stored in the L3 cache together with the encrypted 64-byte memory value. Note, storing a 64-bit nonce in the L3 cache increases the space needed to store each 64-bytes of data by 12.5%. At step 630, if the encrypted 64-bytes of data in the L3 cache are flushed to memory, the associated nonce value is also written to memory. Note, this may result in a small increase in memory write latency. For example, assuming the memory controller writes 64 bits to DRAM each write cycle (as is common for current memory controllers), eight write cycles are needed to store the 64-bytes of encrypted data (and typically a 8-bit checksum) at the corresponding memory address in the DRAM. Storing the 64-bit nonce value requires an additional write cycle. Additionally, in terms of memory, size, storing the nonce for each L3 cache line adds an overhead of 64 bits for each 64 bytes of memory, amounting to a 12.5% increase.

Figure 7:
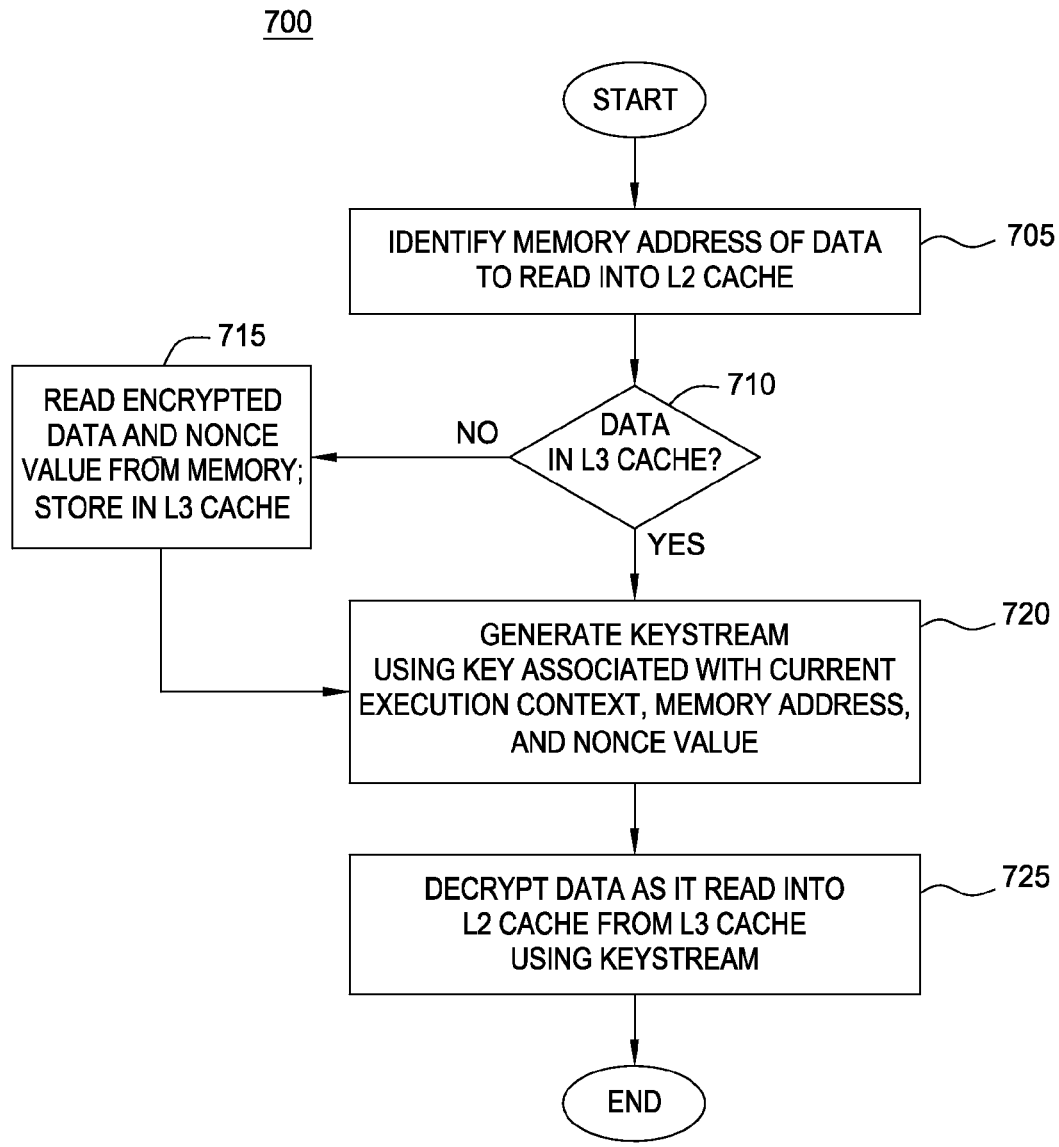
FIG. 7 illustrates a method for decrypting an L3 cache line, according to certain embodiments of the present disclosure.

FIG. 7 depicts a method 700 for decrypting an L3 cache line, according to certain embodiments of the present disclosure. The method 700 further illustrates the write operation 402 of FIG. 4. As shown, the method 700 begins at step 705, where a memory address of data to read into the L2 cache is identified (e.g., memory address $425_2$). For example, a cache miss may occur in the L2 cache, resulting in an attempt to read the requested address from the L3 cache. At step 710, if the requested address is not in already the L3 cache, then at step 715, an L3 cache fault occurs. In such a case, the memory controller fetches encrypted data from the identified memory address as well as fetches the nonce used to encrypt the data stored at that memory address.

Once the encrypted data is in the L3 cache, then the encrypt/decrypt block generates a keystream XORed with data from the L3 cache (step 720). In particular, the encrypt/decrypt block reads the nonce value (e.g., nonce $430_2$) and memory address identified at step 705 (e.g., memory address $425_2$). The nonce is concatenated with the physical memory address identified a step 705 and fed, together with the session key, into the encrypt/decrypt block on the cache line. The AES engine on the encrypt/decrypt block may then regenerate the keystream by successively encrypting incremental values of the he counter (i.e., the memory address and nonce) with the session key of the VM (or hypervisor) provided by the trust anchor (e.g., key $415_2$). At step 725, the resulting keystream is again XORed with the encrypted L3 cache line to generate 64-bytes of plaintext data stored in the L2 cache (e.g., plaintext $405_2$)

In cases where an L2 cache miss and an L3 cache hit occurs, the L3 cache line is immediately available, so re-generating the first 128 bits of the keystream adds ten clock cycles of latency to a memory read from the L3 cache. However, in cases where both an L2 and L3 cache miss occurs, the memory read can be optimized such that the nonce is fetched from memory first. The 64-bytes of encrypted data can then be read of the L3 cache line from memory while the first 128 bits of keystream are computed. In such case, no additional latency is introduced.

In sum, embodiments described herein provide techniques for memory compartmentalization for trusted execution of a virtual machine (VM) on a multi-core processing architecture. Memory compartmentalization may be achieved by encrypting layer 3 (L3) cache lines using a key under the control of a given VM within the trust boundaries of the processing core on which that VMs is executed. Further, embodiments described herein provide an efficient method for storing and processing encryption related metadata associated with each encrypt/decrypt operation performed for the L3 cache lines.

Advantageously, configuring a multi-core CPU with a trust anchor and configuring each cache line between a processing core and a shared L3 cache with a encrypt/decrypt block allows each memory read/write operation to be encrypted using a session key unique to each VM (and hypervisor) running on a virtualization server. Doing so enables the trusted execution of VM instances, even in non-trusted cloud environments and on non-trusted hypervisors.

While the foregoing is directed to embodiments of the present disclosure, other and further embodiments of the disclosure may be devised without departing from the basic scope thereof, and the scope thereof is determined by the claims that follow.

We claim:

1. A method, comprising:
    identifying a memory address;
    obtaining a nonce, wherein the nonce is a fixed-bit size random or pseudorandom number generated, by a trust anchor, for each operation writing data corresponding to the memory address to an L3 cache, wherein the trust anchor manages a first key and at least a second key, wherein the first key and the second key each provide a session key associated, respectively, with a first and a second virtual machine executed on the plurality of processing cores of a central processing unit (CPU), and wherein the first and the second virtual machines are each controlled by a distinct user;
    generating a keystream using the first key, the nonce, and the identified memory address;
    encrypting, using the generated keystream, data corresponding to the memory address while being written from a L1 cache to the L3 cache, wherein the L1 cache and an L2 cache are local to one of a plurality of processing cores on the CPU, and wherein the L3 cache is disposed on the CPU and shared by the plurality of processing cores; and
    writing the nonce to the L3 cache.

2. The method of claim 1, further comprising:
    flushing the data corresponding to the memory address to a memory; and
    writing the nonce to the memory.

3. The method of claim 1, wherein generating the keystream using the first key, the nonce, and the identified memory address comprises:
    concatenating the memory address and the nonce to generate a counter; and
    successively incrementing and applying a keyed pseudorandom function to the counter, resulting in a pseudorandom output.

4. The method of claim 3, wherein encrypting, using the generated keystream, the data corresponding to the memory address while being written from the L1 cache to the L3 cache comprises XORing each bit of the data corresponding to the memory address with a successive bit of the keystream.

5. The method of claim 1, wherein the nonce is a 64-bit value stored by the trust anchor, and wherein the trust anchor increments the nonce for each operation writing data corresponding to the memory address to the L3 cache.

6. The method of claim 1, further comprising:
    reading, from the L3 cache, the nonce corresponding to the memory address;
    re-generating the keystream using the first key, the nonce, and the identified memory address; and
    decrypting, using the generated keystream, data corresponding to the memory address while being read from the L3 cache and written to the L1 cache.

7. A computing system, comprising,
    a memory; and
    a central processing unit (CPU) having:
        a plurality of processing cores, each having a L1 cache and a L2 cache;
        a L3 cache disposed on the CPU, wherein the L3 cache is accessible by each of the plurality of processing cores;
        for each of the plurality of processing cores, an encrypt/decrypt block coupling a respective processing core to the L3 cache, wherein each encrypt/decrypt block is configured to perform an operation, comprising:
            identifying a memory address,
            obtaining a nonce,
            generating a keystream using at least a first key, the nonce, and the identified memory address, and
            encrypting, using the generated keystream, data corresponding to the memory address while being written from the L1 cache to the L3 cache, a memory controller configured to write the nonce to the L3 cache; and, a trust anchor configured to manage a first key and at least a second key, wherein the first key and the second key each provide a session key associated, respectively, with a first and a second virtual machine executed on the plurality of processing cores of the CPU, and wherein the first and the second virtual machines are each controlled by a distinct user, wherein the nonce is a fixed-bit size random or pseudorandom number generated by the trust anchor for each operation writing data corresponding to the memory address to the L3 cache.

8. The computing system of claim 7, wherein the memory controller is further configured to:
flush the data corresponding to the memory address to a memory; and
write the nonce to the memory.

9. The computing system of claim 7, wherein generating the keystream using at least the first key, the nonce, and the identified memory address comprises:
concatenating the memory address and the nonce to generate a counter; and
successively incrementing and applying a keyed pseudorandom function to the counter, resulting in a pseudorandom output.

10. The computing system of claim 9, wherein encrypting, using the generated keystream, the data corresponding to the memory address while being written from the L1 cache to the L3 cache, comprises XORing each bit of the data corresponding to the memory address with a successive bit of the keystream.

11. The computing system of claim 7 wherein the nonce is a 64-bit value stored by the trust anchor, and wherein the trust anchor increments the nonce for each operation writing data corresponding to the memory address to the L3 cache.

12. The computing system of claim 7, wherein the operation further comprises:
reading, from the L3 cache, the nonce corresponding to the memory address;
re-generating the keystream using the first key, the nonce, and the identified memory address; and
decrypting, using the generated keystream, data corresponding to the memory address while being read from the L3 cache and written to the L1 cache.

13. A method, comprising:
attempting to perform a read operation to read data associated with a memory address into one of a plurality of L1 caches, wherein each L1 cache is local to one of a plurality of processing cores on a central processing unit (CPU), and wherein the read operation attempts to read the data associated with the first memory address from a L3 cache, wherein the L3 cache is disposed on the CPU and shared by the plurality of processing cores; and upon determining the data associated with the memory address is in the L3 cache, performing the read operation by:
obtaining a nonce,
generating a keystream using a first key, the nonce, and the memory address, wherein a trust anchor manages the first key and at least a second key, wherein the first key and the second key each provide a session key associated, respectively, with a first and a second virtual machine executed on the plurality of processing cores of the CPU, and wherein the first and the second virtual machines are each controlled by a distinct user, and
decrypting, using the generated keystream, the data associated with the memory address while being read from the L3 cache and written to the L1 cache.

14. The method of claim 13, wherein the nonce is obtained from the L3 cache.

15. The method of claim 13, further comprising:
upon determining the data associated with the memory address is not in the L3 cache, performing the read operation by:
reading the data associated with the memory address from a memory into the L3 cache,
reading, from the memory, a nonce into the L3 cache,
generating a keystream using at least a first key, the nonce, and the memory address, and
decrypting, using the generated keystream, the data associated with the memory address while being read from the L3 cache to the L1 cache.

16. The method of claim 13, wherein generating the keystream using at least the first key, the nonce, and the memory address comprises:
concatenating the memory address and the nonce to generate a counter; and
successively incrementing and applying a keyed pseudorandom function to the counter, resulting in a pseudorandom output.

17. The method of claim 16, wherein decrypting, using the generated keystream, the data associated with memory address while being read from the L3 cache to the L1 cache comprises XORing each bit of the data associated with the memory address with a successive bit of the keystream.

18. The method of claim 13, wherein the nonce is a 64-bit value provided by a trust anchor, and wherein the trust anchor increments the nonce for each write operation writing data from the one of the plurality of L1 caches to the L3 cache.

19. The method of claim 13, wherein the nonce is a fixed-bit size random or pseudorandom number provided by a trust anchor for each write operation writing data from the one of the plurality of L1 caches to the L3 cache.

* * * * *